R. L. McCORMICK.
STADIA ATTACHMENT FOR ANGLE INDICATORS.
APPLICATION FILED JAN. 5, 1912.
1,048,718.
Patented Dec. 31, 1912.
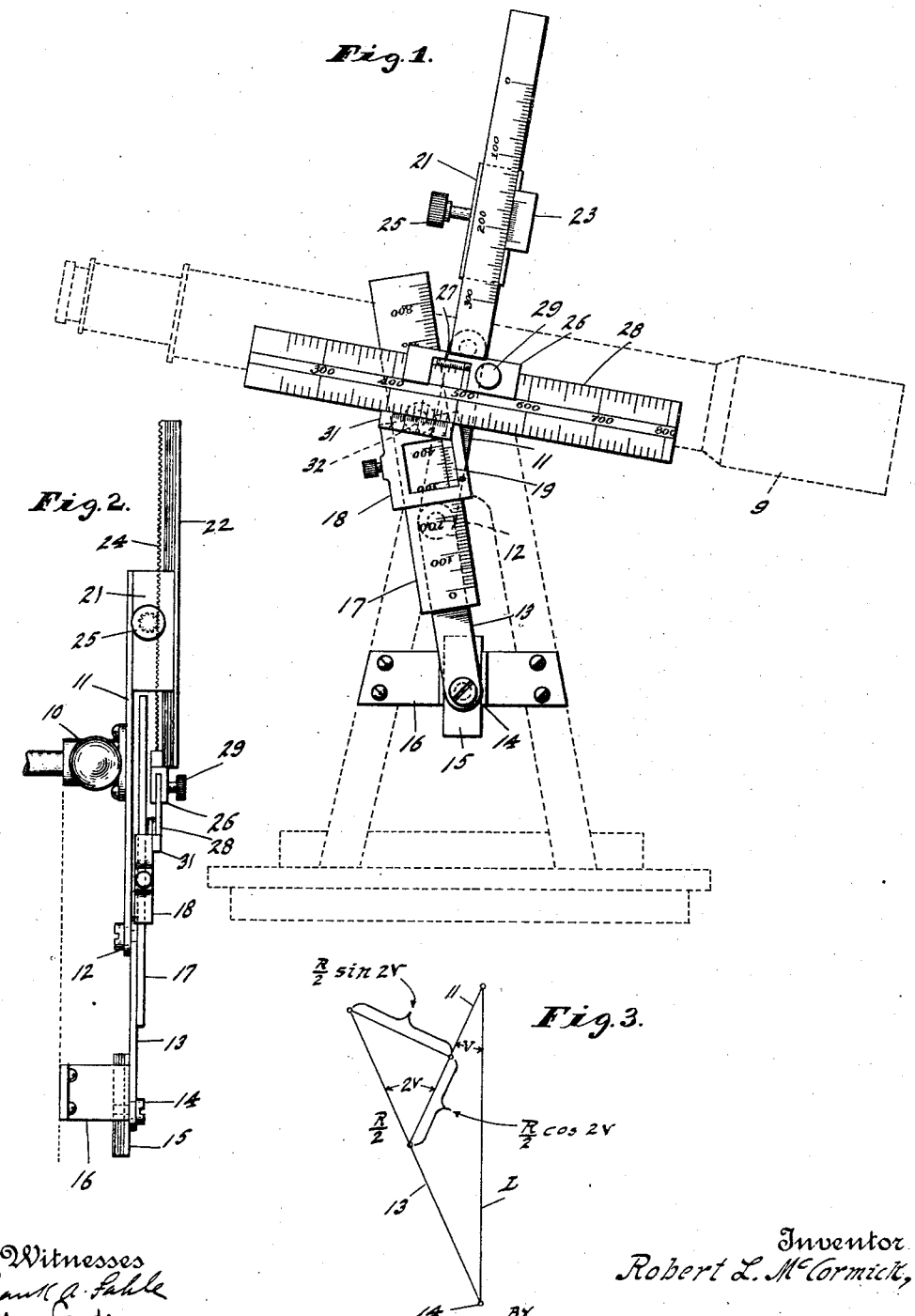
Witnesses
Inventor
Robert L. McCormick,
By Arthur M. Hood
Attorney

UNITED STATES PATENT OFFICE.

ROBERT L. McCORMICK, OF TERRE HAUTE, INDIANA.

STADIA ATTACHMENT FOR ANGLE-INDICATORS.

1,048,718.

Specification of Letters Patent. Patented Dec. 31, 1912.

Application filed January 5, 1912. Serial No. 669,571.

*To all whom it may concern:*

Be it known that I, ROBERT L. MCCORMICK, a citizen of the United States, residing at Terre Haute, in the county of Vigo and State of Indiana, have invented a new and useful Stadia Attachment for Angle-Indicators, of which the following is a specification.

The object of my invention is to produce an attachment for transits by means of which absolute elevation of any desired point may be mechanically determined as a result of a proper setting of the transit relative to such point, and by means of which the horizontal distance between the transit station and such point may be also mechanically indicated. More broadly stated, my invention comprises three coöperating members for the mechanical indication of the stadia diagram values $$\frac{R}{2} \sin. 2v$$

and $$\frac{R}{2} \cos. 2v$$

where R=stadia rod reading and $v$=the angle of inclination of a transit reading.

The accompanying drawings illustrate my invention.

Figure 1 is a front elevation of the attachment; Fig. 2 a side elevation; and Fig. 3 a diagram.

In the drawings, 10 indicates a head which may be clamped upon a stud projecting axially from the trunnion of the telescope 9 of the transit. This head 10 carries an arm 11 in a plane at right angles to the pivotal axis of the telescope, and pivotally connected to the outer end of this arm, at 12, is a link 13, the length of which is equal to the length of arm 11 between the axis of head 10 and the pivot 12. The outer end of link 13 is pivotally connected at 14 to a slide 15 which is freely slidable in a fixed head 16 along a right line which is at right angles to the axis of head 10 and in a plane parallel with the plane of swing of the telescope.

Link 13 carries a scale 17 which is arbitrarily divided into main divisions, each conveniently indicating one hundred feet, and subdivided into 10 foot divisions. Slidably mounted upon the scale 17 is a head 18 having a vernier scale 19 designed to coöperate with the scale 17, the head 18 being capable of being brought into any desired relationship with the scale 17.

Slidably mounted in a guide 21, which is mounted upon arm 11 and is parallel with the plane of swing of the telescope, is a scale 22 divided into major divisions which are twice the length of the major divisions of scale 17 but are marked to indicate the same reading as the major divisions of scale 17; *i. e.*, for example, 100 feet. The major divisions of scale 22 may be subdivided as desired, conveniently into 5 foot divisions. Mounted upon guide 21 is a stationary vernier 23 arranged to coöperate with scale 22. Scale 22 may be shifted in its guide way 21 by any suitable means, such, for instance, as the rack 24 and pinion 25.

Mounted upon one end of scale 22, above scale 17, is a transverse head 26 which is in a plane parallel with the plane of swing of the telescope and is also parallel with the optical axis of the telescope at all times. Head 26 is provided with a vernier 27 which coöperates with a scale 28 which is slidably mounted in the head 26 and may be clamped in any position by clamping screw 29. The major divisions of the scale 28 are equal to those of the scale 22. Pivotally mounted upon the vernier head 18 is a second vernier 31, the pivot 32 of which is parallel with the horizontal axis of the telescope and this pivoted vernier 31 is arranged to coöperate with scale 28.

The several scales are so arranged that, when the telescope has its optical axis in the horizontal plane, the zero of vernier 18 may be brought to the zero of scale 17, the zero of scale 22 may be brought to the zero of vernier 23, and the zeros of verniers 27 and 31 will be in alinement with each other and with any reading of scale 28 depending upon the position which said scale 28 occupies with relation to head 26. In this position of the parts, the pivot points 12 and 14 will be in alinement with each other and with a point on the axis of head 10.

In operation, with the transit placed above any station of known elevation, say 500 feet, scale 28 will be set with its mark indicating the elevation of the transit station (*i. e.*, its 500 foot mark) opposite the zero of vernier 27. The telescope will then be directed toward a stadia rod held at the point whose horizontal and vertical position is to be determined, (arm 11 swinging with the telescope and arm 13 swinging through an equal but opposite angle), whereupon the transit man may take a stadia rod reading. Thereupon head 18 is shifted upon scale 17 until the vernier 19 comes to that point upon scale 17 corresponding to the stadia rod reading and is there clamped in place. Scale 22 is then shifted to bring scale 28 into engagement with vernier 31, said vernier swinging upon its pivot to come into coöperation with the adjacent edge of scale 28. The position upon scale 28 indicated by the zero of vernier 31 will be a closely approximate designation of the vertical elevation of the point upon which the stadia rod is resting, referred to the same datum as the transit station. The reading on scale 22, as indicated by vernier 23, when added to half the stadia rod reading will be equal (within a generally negligible error) to the horizontal distance of the rod point from the transit station.

If, when the arm 11 and link 13 are in alinement and with the zero of head 18 in registry with the zero of scale 17, the zero of the swinging vernier 31 lies in the axis of the pivotal connection 12 then the above readings mentioned as indicating the horizontal and vertical position of the rod station will not be absolutely accurate, missing accuracy only by the constant of the transit, but, as this constant is small and a readily computable quantity, and also a readily ascertainable quantity from existing tables prepared for each transit, the slight departure from exact accuracy is ordinarily ignored even by present methods of computation. If greater accuracy is desired in order to take account of the constant of the instrument, as indicated by the more complete formulæ

$$\frac{R}{2} \sin. 2v + f \sin. v$$

and $$\frac{R}{2}(1 + \cos. 2v) + f \cos. v;$$

the desired result may be accomplished by so arranging the zero of scale 17 that, when the zero of scale 19 of head 18 is in registry therewith, the zero of the swinging vernier 31 will lie above the axis of the pivotal point 12 a distance equal to $f$ where $f$ is the constant of the transit reduced to the scale of scale 17; and by so arranging the zero of scale 22 that, when scale 28 is brought down against the swinging vernier 31 and the zero of scale 19 is in registry with the zero of scale 17, it will lie above the zero of the fixed scale 23 an amount equal to $\frac{f}{2}$.

Mathematically this conclusion is reached as follows: The complete formulæ being $$\frac{R}{2} \sin. 2v + f \sin. v$$

it may be written $$\frac{R}{2} \sin. 2v + \frac{f}{2} \sin. 2v$$

or $$\left(\frac{R}{2} + \frac{f}{2}\right) \sin. 2v,$$

and still be as accurate as desired because, the values of $v$ and $f$ are both very small and for all practical purposes sin. $2v = 2$ sin. $v$, at least as close as the scales can be practically read. Consequently for all practical purposes, $$f \sin. v = \frac{f}{2} \sin. 2v$$

and if the zero of vernier 31 is set $f$ distance above the center of pivot 12 when the zero of scale 19 is coincident with the zero of scale 17, then the distance indicated as $\frac{R}{2}$ in Fig. 3 will be $$\frac{R}{2} + \frac{f}{2}$$

and $$\frac{R}{2} \sin. 2v$$

will be $$\frac{R}{2} \sin. 2v + \frac{f}{2} \sin. 2v.$$

Similarly, for the very small angles $v$ which are used, cos. $v =$ cos. $2v$ practically and therefore the formula $$\frac{R}{2} \cos. 2v + \frac{f}{2} \cos. v$$

may for all practical purposes be written $$\frac{R}{2} \cos. 2v + \frac{f}{2} \cos. 2v$$

and $\frac{f}{2}$ may be included in the readings by setting the zero of scale 22 a distance $\frac{f}{2}$ above the zero of scale 23.

The mathematical demonstration of the instrument is as follows: Arm 11 being equal in length to link 13, the angle $v$ of inclination of arm 11 from the normal line L of coincidence of arm 11 and link 13, due to the corresponding displacement angle of the telescope from horizontal, will be equal to one-half of the supplemental angle between arm 11 and link 13; i. e., angle 2v, Fig. 3. The divisions of scale 17 being one-half the size of those of scale 28, and scale 28 being graduated to indicate the elevation of the transit station, and R indicating any stadia rod reading, distances on scale 17 (the division of which are one-half the absolute size of those on the other two scales) will correspond to $\frac{R}{2}$ for comparison with distances on the other scales. Using a distance, determined by the setting of the vernier 19, on scale 17 as the hypotenuse of a right angle triangle whose base is the medial line of arm 11, the other side X of the triangle will be equal, or rather will correspond to $$\frac{R}{2} \sin. 2v,$$

and the distance determined by the reading upon scale 22, which will indicate that portion of arm 11 which will be the base of the triangle, will correspond to $$\frac{R}{2} \cos. 2v.$$

The line X will have a length equal to the difference indicated by the readings of the two verniers 27 and 31 upon scale 28 so that the absolute reading of the zero of vernier 31 on scale 28 will give the absolute elevation of the stadia rod station, (neglecting the small constant of the transit).

The horizontal distance between the transit station and the stadia rod station is equal, by a well known formula, to $$\frac{R}{2}(1 + \cos. 2v)$$

which equals $$\frac{R}{2} + \frac{R}{2} \cos. 2v.$$

As $$\frac{R}{2} \cos. 2v$$

equals the reading on scale 22, the horizontal distance between the transit station and the stadia rod station will be, of course, half the rod reading added to the reading on scale 22.

Scale 17 might be graduated in major divisions having the same magnitude as the major divisions of the other two scales but in that case the stadia rod reading would have to be divided by two in order to determine the proper setting of head 18.

I claim as my invention:

1. A stadia attachment for angle indicators comprising an arm for attachments to and to swing with the angle indicator, a link pivotally connected to said arm at one end and having its other end supported to slide along a line passing through the axis of the arm and indicator, said link having a length equal to the length of the arm between its axis and its pivotal connection with the link, a graduated scale carried by the link, an indicator head coöperating with and movable along said scale, a second indicator carried by said indicator head and pivoted thereon on an axis parallel with the axis of the arm, a second graduated scale coöperating with said second indicator and arranged to be shiftable in a plane parallel with the plane of angle indication of the angle indicator, a support for said second scale carried by the arm and movable lengthwise thereof, and a third graduated scale affording longitudinal readings for variation of position of the second scale lengthwise of the arm, the primary divisions of the first scale being one-half the size of corresponding divisions of the second and third scales.

2. A stadia attachment for angle indicators comprising an arm for attachment to and to swing with the angle indicator, a link pivotally connected to said arm at one end and having its other end supported to slide along a line passing through the axis of the arm and indicator, said link having a length equal to the length of the arm between its axis and its pivotal connection with the link, a graduated scale carried by the link, an indicator head coöperating with and movable along said scale, a second indicator carried by said indicator head, a second graduated scale coöperating with said second indicator and arranged to be shiftable in a plane parallel with the plane of angle indication of the angle indicator, a support for said second scale carried by the arm and movable lengthwise thereof, and a third graduated scale affording longitudinal readings for variation of position of the second scale lengthwise of the arm, the primary divisions of the first scale being one-half the size of corresponding divisions of the second and third scales.

3. A stadia attachment for angle indicators comprising an arm for attachment to and to swing with the angle indicator, a link pivotally connected to said arm at one end and having its other end supported to slide along a line passing through the axis of the arm and indicator, a graduated scale carried by the link, an indicator head coöperating with and movable along said scale, a second indicator carried by said indicator head and pivoted thereon on an axis parallel with the axis of the arm, a second graduated scale coöperating with said second indicator and arranged to be shiftable in a plane parallel with the plane of angle indication of the angle indicator, a support for said second scale carried by the arm and movable lengthwise thereof, and a third graduated scale affording longitudinal readings for variation of position of the second scale lengthwise of the arm, the primary divisions of the first scale being one-half the size of corresponding divisions of the second and third scales.

4. A stadia attachment for angle indicators comprising an arm for attachment to and to swing with the angle indicator, a link pivotally connected to said arm at one end and having its other end supported to slide along a line passing through the axis of the arm and indicator, a graduated scale carried by the link, an indicator head coöperating with and movable along said scale, a second indicator carried by said indicator head, a second graduated scale coöperating with said second indicator and arranged to be shiftable in a plane parallel with the plane of angle indication of the angle indicator, a support for said second scale carried by the arm and movable lengthwise thereof, and a third graduated scale affording longitudinal readings for variation of position of the second scale lengthwise of the arm, the primary divisions of the first scale being one-half the size of corresponding divisions of the second and third scales.

5. A stadia attachment for angle indicators comprising an arm for attachment to and to swing with the angle indicator, a link pivotally connected to said arm at one end and having its other end supported to slide along a line passing through the axis of the arm and indicator, said link having a length equal to the length of the arm between its axis and its pivotal connection with the link, a graduated scale carried by the link, an indicator head coöperating with and movable along said scale, a second indicator carried by said indicator head and pivoted thereon on an axis parallel with the axis of the arm, a second graduated scale coöperating with said second indicator and arranged to be shiftable in a plane parallel with the plane of angle indication of the angle indicator, a support for said second scale carried by the arm and movable lengthwise thereof, and a third graduated scale affording longitudinal readings for variation of position of the second scale lengthwise of the arm.

6. A stadia attachment for angle indicators comprising an arm for attachment to and to swing with the angle indicator, a link pivotally connected to said arm at one end and having its other end supported to slide along a line passing through the axis of the arm and indicator, said link having a length equal to the length of the arm between its axis and its pivotal connection with the link, a graduated scale carried by the link, an indicator head coöperating with and movable along said scale, a second indicator carried by said indicator head, a second graduated scale coöperating with said second indicator and arranged to be shiftable in a plane parallel with the plane of angle indication of the angle indicator, a support for said second scale carried by the arm and movable lengthwise thereof, and a third graduated scale affording longitudinal readings for variation of position of the second scale lengthwise of the arm.

7. A stadia attachment for angle indicators comprising an arm for attachment to and to swing with the angle indicator, a link pivotally connected to said arm at one end and having its other end supported to slide along a line passing through the axis of the arm and indicator, a graduated scale carried by the link, an indicator head coöperating with and movable along said scale, a second indicator carried by said indicator head and pivoted thereon on an axis parallel with the axis of the arm, a second graduated scale coöperating with said second indicator and arranged to be shiftable in a plane parallel with the plane of angle indication of the angle indicator, a support for said second scale carried by the arm and movable lengthwise thereof, and a third graduated scale affording longitudinal readings for variation of position of the second scale lengthwise of the arm.

8. A stadia attachment for angle indicators comprising an arm for attachment to and to swing with the angle indicator, a link pivotally connected to said arm at one end and having its other end supported to slide along a line passing through the axis of the arm and indicator, a graduated scale carried by the link, an indicator head coöperating with and movable along said scale, a second indicator carried by said indicator head, a second graduated scale coöperating with said second indicator and arranged to be shiftable in a plane parallel with the plane of angle indication of the angle indicator, a support for said second scale carried by the arm and movable lengthwise thereof, and a third graduated scale affording longitudinal readings for variation of position of the second scale lengthwise of the arm.

9. A means for mechanically indicating the value of $$\frac{R}{2} \sin. 2v$$

and $$\frac{R}{2} \cos. 2v$$

in a stadia diagram comprising two members by varying the inclination of the transit telescope to define angles twice the angle of inclination of such telescope, a scale carried by one of said members and adjustable to correspond to any stadia rod reading $R$ as indicated by the transit telescope, and two coöperating scales carried by the other member and indicating for any given angle $v$ of inclination of the transit telescope and adjustment of the first scale, the product $$\frac{R}{2} \sin. 2v$$

and $$\frac{R}{2} \cos. 2v,$$

respectively.

10. A stadia attachment for angle indicators, comprising an arm movable proportionately with the angle-indicating member, a second arm connected to the first arm for proportional movement relative thereto, a graduated scale carried by the second arm and partaking of its movement, a graduated scale carried by the first arm and partaking of its movement, an indicator movably mounted upon the first mentioned scale and carrying an indicator coöperating with the second mentioned scale to give readings corresponding to the variable angle between the first and second arms due to the movement of the first arm, and a graduated scale for indicating the longitudinal position of the second mentioned scale relative to the first mentioned arm.

11. A stadia attachment for angle indicators, comprising an arm movable proportionately with the angle-indicating member, a second arm connected to the first arm for proportional movement relative thereto, a graduated scale carried by the second arm and partaking of its movement, a graduated scale carried by the first arm and partaking of its movement, an indicator movably mounted upon the first mentioned scale and carrying an indicator coöperating with the second mentioned scale to give readings corresponding to the variable angle between the first and second arms due to the movement of the first arm, and a graduated scale for indicating the longitudinal position of the second mentioned scale relative to the first mentioned arm, the primary graduations of the first mentioned scale being one-half those of the other two scales.

12. A stadia attachment for angle indicators comprising an arm connected to and partaking of the angular movement of the angle indicator, a second arm connected to the first arm so as to be moved thereby to produce a supplemental angle therewith equal to double the angle of displacement of the first arm from normal position, a graduated scale carried by said second arm longitudinally thereof, a second graduated scale carried by the first arm transversely thereof, an indicator carried by the first mentioned scale and coöperating therewith, a second indicator carried by the first mentioned indicator to coöperate with the second mentioned scale, and means for indicating the position of the second mentioned scale relative to the length of the first mentioned arm the primary graduations of the first mentioned scale being one-half those of the other two scales.

13. A stadia attachment for angle indicators comprising an arm connected to and partaking of the angular movement of the angle indicator, a second arm connected to the first arm so as to be moved thereby to produce a supplemental angle therewith equal to double the angle of displacement of the first arm from normal position, a graduated scale carried by said second arm longitudinally thereof, a second graduated scale carried by the first arm transversely thereof, an indicator carried by the first mentioned scale and coöperating therewith, a second indicator carried by the first mentioned indicator to coöperate with the second mentioned scale, and means for indicating the position of the second mentioned scale relative to the length of the first mentioned arm.

14. A stadia attachment for angle indicators comprising an arm connected to and partaking of the angular movement of the angle indicator, a second arm connected to the first arm so as to be moved thereby to produce a supplemental angle therewith equal to double the angle of displacement of the first arm from normal position, a graduated scale carried by said second arm longitudinally thereof, a second graduated scale carried by the first arm transversely thereof, an indicator carried by the first mentioned scale and coöperating therewith, and a second indicator carried by the first mentioned indicator to coöperate with the second mentioned scale, the primary graduations of the first mentioned scale being one-half those of the other scale.

15. A stadia attachment for angle indicators comprising an arm connected to and partaking of the angular movement of the angle indicator, a second arm connected to the first arm so as to be moved thereby to produce a supplemental angle therewith equal to double the angle of displacement of the first arm from normal position, a graduated scale carried by said second arm longitudinally thereof, a second graduated scale carried by the first arm transversely thereof, an indicator carried by the first mentioned scale and coöperating therewith, and a second indicator carried by the first mentioned indicator to coöperate with the second mentioned scale.

16. A stadia attachment for angle indicators comprising an arm for attachment to and to swing with the angle indicator, a link pivotally connected to said arm at one end and having its other end supported to slide along a line passing through the axis of the arm and indicator, said link having a length equal to the length of the arm between its axis and its pivotal connection with the link, a graduated scale carried by and extending longitudinally of the link, an indicator head coöperating with and movable along said scale, a second indicator carried by said indicator head and pivoted thereon on an axis parallel with the axis of the arm, a second graduated scale coöperating with said second indicator and extending transversely to said arm and said axes, said second graduated scale being carried by said arm and shiftable lengthwise thereof, and a third graduated scale for indicating the position of the second scale lengthwise of the arm.

17. A stadia attachment for angle indicators comprising an arm for attachment to and to swing with the angle indicator, a link pivotally connected to said arm at one end and having its other end supported to slide along a line passing through the axis of the arm and indicator, said link having a length equal to the length of the arm between its axis and its pivotal connection with the link, a graduated scale carried by and extending longitudinally of the link, an indicator head coöperating with and movable along said scale, a second indicator carried by said indicator head and pivoted thereon on an axis parallel with the axis of the arm, a second graduated scale coöperating with said second indicator and extending transversely to said arm and said axes, said second graduated scale being carried by said arm and shiftable lengthwise thereof, and a third graduated scale for indicating the position of the second scale lengthwise of the arm, the primary divisions of the first scale being one-half the size of the corresponding divisions of the second and third scales.

18. A stadia attachment for angle indicators comprising an arm for attachment to and to swing with the angle indicator, a link pivotally connected to said arm at one end and having its other end supported to slide along a line passing through the axis of the arm and indicator, said link having a length equal to the length of the arm between its axis and its pivotal connection with the link, a graduated scale carried by and extending longitudinally of the link, an indicator head coöperating with and movable along said scale, a second indicator carried by said indicator head and pivoted thereon on an axis parallel with the axis of the arm, a second graduated scale coöperating with said second indicator and extending transversely to said arm and said axes, said second graduated scale being carried by said arm and shiftable lengthwise thereof, a third graduated scale for indicating the position of the second scale lengthwise of the arm, said second scale being also shiftable transversely to said arm, and an indicator for indicating the amount of said last named shifting of said scale.

In witness whereof, I, have hereunto set my hand and seal at Indianapolis, Indiana, this 29th day of December, A. D. one thousand nine hundred and eleven.

ROBERT L. McCORMICK. [L. S.]

Witnesses:
ARTHUR M. HOOD,
FRANK A. FAHLE.